United States Patent
Kim et al.

(10) Patent No.: US 10,511,420 B2
(45) Date of Patent: Dec. 17, 2019

(54) METHOD AND DEVICE FOR RECEIVING BROADCAST INFORMATION IN COMMUNICATION SYSTEM

(71) Applicant: Samsung Electronics Co., Ltd., Suwon-si, Gyeonggi-do (KR)

(72) Inventors: Dong-Han Kim, Yongin-si (KR); Young-Bum Kim, Seoul (KR); Youn-Sun Kim, Seongnam-si (KR); Kyeong-In Jeong, Yongin-si (KR); Seung-Hoon Choi, Suwon-si (KR); Sang-Min Ro, Seoul (KR); Ju-Ho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 60 days.

(21) Appl. No.: 15/576,063

(22) PCT Filed: May 20, 2016

(86) PCT No.: PCT/KR2016/005392
§ 371 (c)(1),
(2) Date: Nov. 21, 2017

(87) PCT Pub. No.: WO2016/190623
PCT Pub. Date: Dec. 1, 2016

(65) Prior Publication Data
US 2018/0159671 A1     Jun. 7, 2018

(30) Foreign Application Priority Data
May 22, 2015    (KR) .................. 10-2015-0071847

(51) Int. Cl.
*H04L 5/00*        (2006.01)
*H04W 72/04*      (2009.01)
(Continued)

(52) U.S. Cl.
CPC ........ *H04L 5/0044* (2013.01); *H04J 11/0069* (2013.01); *H04L 5/0053* (2013.01);
(Continued)

(58) Field of Classification Search
CPC ..................................................... H04L 5/0044
(Continued)

(56) References Cited

U.S. PATENT DOCUMENTS

2010/0086129 A1\*   4/2010   Park ..................... H04J 13/00
                                                                      380/42
2013/0250878 A1    9/2013   Sayana et al.
(Continued)

FOREIGN PATENT DOCUMENTS

| KR | 10-2015-0020296 A | 2/2015 |
|---|---|---|
| KR | 10-2015-0035675 A | 4/2015 |
| WO | 2015/046928 A1 | 4/2015 |

*Primary Examiner* — Shripal K Khajuria
(74) *Attorney, Agent, or Firm* — Jefferson IP Law, LLP

(57) ABSTRACT

Disclosed are a communication technique for merging, with IoT technology, a 5G communication system for supporting a data transmission rate higher than that of a 4G system, and a system therefor. The disclosed communication technique and system therefor can be applied to intelligent services (for example, smart home, smart building, smart city, smart car or connected car, health care, digital education, retail, security and safety related services, and the like) on the basis of 5G communication technology and IoT-related technology. The present disclosure relates to a method and a device for receiving, by a terminal, broadcast information in a communication system. According to an embodiment of the present disclosure, the method by which a terminal receives broadcast information in a communication system comprises the steps of: receiving a plurality of radio frames from a base station; extracting at least one broadcasting channel signal from the plurality of radio frames in every set period; combining, for a preset time slot, the at least one broadcast- (Continued)

ing channel signal extracted in every set period; and acquiring broadcast information by decoding the combined broadcasting channel signal.

20 Claims, 10 Drawing Sheets

(51) Int. Cl.
*H04J 11/00* (2006.01)
*H04W 48/16* (2009.01)
*H04W 56/00* (2009.01)
*H04L 1/00* (2006.01)

(52) U.S. Cl.
CPC ....... *H04W 48/16* (2013.01); *H04W 72/0446* (2013.01); *H04L 1/00* (2013.01); *H04W 56/001* (2013.01)

(58) Field of Classification Search
USPC .......................................... 370/329
See application file for complete search history.

(56) References Cited

U.S. PATENT DOCUMENTS

| | | | |
|---|---|---|---|
| 2014/0098761 A1* | 4/2014 | Lee | H04W 74/006 370/329 |
| 2015/0043420 A1 | 2/2015 | Xiong et al. | |
| 2015/0229443 A1* | 8/2015 | Hwang | H04L 27/2602 370/474 |
| 2016/0013903 A1* | 1/2016 | Kim | H04J 11/005 370/329 |
| 2016/0197757 A1* | 7/2016 | Baek | H04L 27/2627 375/295 |
| 2018/0343571 A1* | 11/2018 | Kim | H04J 11/00 |

* cited by examiner

METHOD AND DEVICE FOR RECEIVING BROADCAST INFORMATION IN COMMUNICATION SYSTEM

PRIORITY

This application is a National Phase Entry of PCT International Application No. PCT/KR2016/005392, which was filed on May 20, 2016, and claims a priority to Korean Patent Application No. 10-2015-0071847, which was filed on May 22, 2015, the contents of which are incorporated herein by reference

TECHNICAL FIELD

The present disclosure relates to a method and an apparatus for receiving broadcast information by a UE in a communication system.

BACKGROUND ART

In order to meet wireless data traffic demands, which have increased since the commercialization of a 4th-Generation (4G) communication system, efforts to develop an improved 5G communication system or a pre-5G communication system have been made. For this reason, the 5G communication system or the pre-5G communication system is called a beyond-4G network communication system or a post-Long Term Evolution (LTE) system.

In order to achieve a high data transmission rate, an implementation of the 5G communication system in a mmWave band (for example, a 60 GHz band) is being considered. In the 5G communication system, technologies such as beamforming, massive Multi-Input Multi-Output (MIMO), Full Dimensional MIMO (FD-MIMO), an array antenna, analog beam-forming, and a large scale antenna are discussed to mitigate propagation path loss in the mmWave band and increase a propagation transmission distance.

Further, technologies such as an evolved small cell, an advanced small cell, a cloud Radio Access Network (cloud RAN), an ultra-dense network, Device-to-Device communication (D2D), a wireless backhaul, a moving network, cooperative communication, Coordinated Multi-Points (CoMP), and interference cancellation have been developed to improve the system network in the 5G communication system.

In addition, Advanced Coding Modulation (ACM) schemes such as Hybrid Frequency Shift Keying (FSK) and Quadrature Amplitude Modulation (QAM), Sliding Window Superposition Coding (SWSC), and advanced access technologies such as Filter Bank Multi Carrier (FBMC), Non-Orthogonal Multiple Access (NOMA), and Sparse Code Multiple Access (SCMA) have been developed for the 5G system.

Meanwhile, the Internet has evolved to an Internet of Things (IoT) network in which distributed components such as objects exchange and process information from a human-oriented connection network in which humans generate and consume information. Internet of Everything (IoE) technology may be an example of a combination of the IoT technology and big data processing technology through a connection with a cloud server.

In order to implement the IoT, research into technical factors such as a sensing technique, wired/wireless communication and network infrastructure, service interface technology, and security technology is required, and thus technologies such as a sensor network, Machine to Machine (M2M), Machine Type Communication (MTC), and the like are being studied so as to realize connection between objects.

In an IoT environment, through collection and analysis of data generated in connected objects, an Internet Technology (IT) service for creating new value in people's lives may be provided. The IoT may be applied to fields such as a smart home, smart building, smart city, smart car, connected car, smart grid, health care, smart home appliance, or high-tech medical service, through the convergence of the conventional Information Technology (IT) and various industries.

Accordingly, various attempts to apply the 5G communication system to the IoT network have been made. For example, 5G communication technologies such as a sensor network, Machine-to-Machine (M2M) communication, and MTC are implemented using schemes such as beamforming, MIMO, and array-antenna schemes. The application of a cloud RAN, as a big data processing technology, may be an example of convergence of the 5G technology and the IoT technology.

The communication system has been developed to a wideband communication system that provides a high-speed and high-quality packet data service, such as High Speed Packet Access (HSPA) of 3GPP, LTE or Evolved Universal Terrestrial Radio Access (E-UTRA), High Rate Packet Data (HRPD) of 3GPP2, Ultra Mobile Broadband (UMB), and the communication standard of Institute of Electrical and Electronics Engineers (IEEE) 802.16e, beyond an initial communication system that provides a voice-oriented service.

In the communication system, a User Equipment (UE) communicates with a Base Station (BS) after receiving broadcast information by performing synchronization and a cell search through initial signals (that is, a Primary Synchronization Signal (PSS) and a Secondary Synchronization Signal (SSS)) received from the BS. The broadcast information is information required by the UE in performing initial access to the BS and communication. At this time, the UE may improve a communication coverage by repeatedly receiving or transmitting the same initial signal from or to the BS. However, when the repetition of the initial signal transmitted from the BS to the UE is not sufficient, the UE may not receive broadcast information of the BS depending on the location or a situation of the UE, and accordingly, may not communicate with the BS. For example, when the UE is a smart meter or a fixed sensor used in a shaded area, such as the basement of a building, if the UE does not receive a broadcasting signal from the BS since the UE cannot move, communication with the BS is continuously impossible. Accordingly, a method by which the UE receives broadcast information to improve the communication coverage in the communication system is required.

DETAILED DESCRIPTION OF THE INVENTION

Technical Problem

An embodiment of the present disclosure provides a method and an apparatus for receiving broadcast information in a communication system.

Further, an embodiment of the present disclosure provides a method and an apparatus for receiving broadcast information to improve communication coverage by a UE in the communication system.

In addition, an embodiment of the present disclosure provides a method and an apparatus for receiving broadcast information by repeatedly identifying a broadcasting channel signal by the UE in the communication system.

Technical Solution

In accordance with an aspect of the present disclosure, a method of receiving broadcast information by a UE in a communication system is provided. The method includes: receiving a plurality of radio frames from a BS; extracting at least one broadcasting channel signal from the plurality of radio frames at every predetermined period; combining the at least one broadcasting channel signal extracted at every predetermined period for a preset time interval; and acquiring broadcast information by decoding the combined broadcasting channel signal.

In accordance with another aspect of the present disclosure, an apparatus for receiving broadcast information by a UE in a communication system is provided. The apparatus includes: a receiver that receives a plurality of radio frames from a BS; and a controller that extracts at least one broadcasting channel signal from the plurality of radio frames at every predetermined period, combines the at least one broadcasting channel signal extracted at every predetermined period for a preset time interval, and acquires broadcast information by decoding the combined broadcasting channel signal.

BRIEF DESCRIPTION OF DRAWINGS

The above and other aspects, features and advantages of the present disclosure will be more apparent from the following detailed description taken in conjunction with the accompanying drawings, in which.

MODE FOR CARRYING OUT THE INVENTION

Hereinafter, an exemplary embodiment of the present disclosure will be described in detail with reference to the accompanying drawings. In the following description, it should be noted that only portions required for comprehension of operations according to the embodiments of the present disclosure will be described and descriptions of other portions will be omitted not to make subject matters of the present disclosure obscure.

First, a method of transmitting broadcast information in a communication system to which the present disclosure is applied will be described with reference to FIGS. 1 to 3.

The communication system representatively includes, for example, an orthogonal frequency division multiplexing scheme in a downlink and a Single Frequency Division Multiple Access (SC-FDMA) scheme in an uplink as multiple access schemes in an LTE system. In the multiple access schemes as described above, time-frequency resources for carrying data or control information are allocated and operated in a manner to prevent overlapping of the resources, i.e. to establish the orthogonality, between users, so as to identify data or control information of each user. Hereinafter, although it is assumed that the communication system is the LTE system in an embodiment of the present disclosure, the embodiment of the present disclosure can be applied to another communication system.

Figure 1:
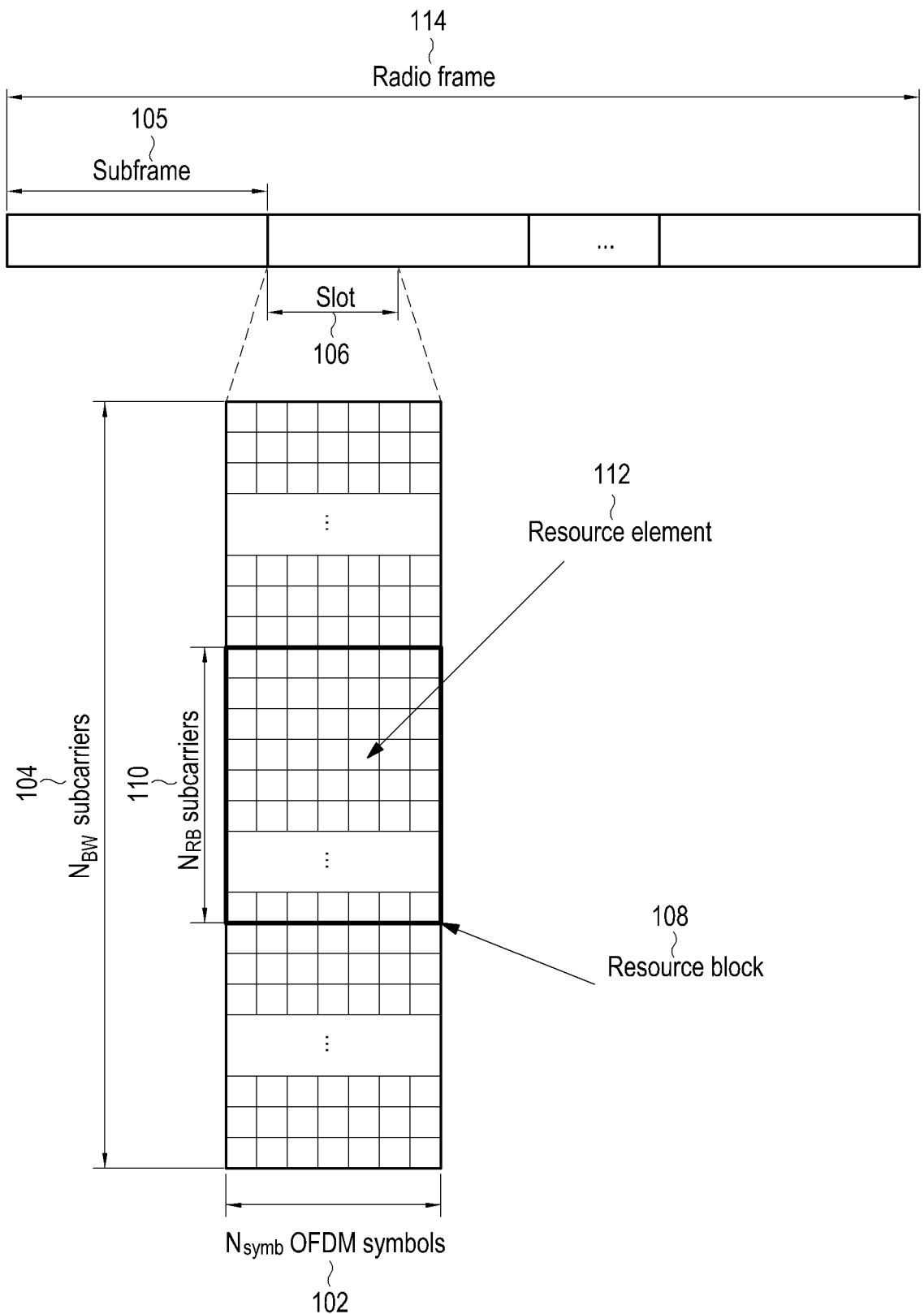
FIG. 1 illustrates a downlink frame structure in an LTE system to which an embodiment of the present disclosure is applied.

FIG. 1 illustrates a downlink frame structure in the LTE system to which an embodiment of the present disclosure is applied, the downlink frame structure corresponding to a basic frame structure of time and frequency domains corresponding to radio resource areas in which data or control channels are transmitted in the downlink.

Referring to FIG. 1, a horizontal axis indicates the time domain and a vertical axis indicates the frequency domain. A minimum transmission unit in the time domain is an OFDM symbol. Nsymb OFDM symbols 102 constitute one slot 106 and two slots constitute one subframe 105. The length of one slot 106 is 0.5 ms and the length of the subframe 105 is 1.0 ms. One radio frame 114 is a time domain unit consisting of 10 subframes.

A minimum transmission unit in the frequency domain is a subcarrier, and the bandwidth of an entire system transmission band consists of a total of NBW subcarriers 104.

A basic unit of resources in the time and frequency domains is a Resource Element (RE) 112 and may be indicated by an OFDM symbol index and a subcarrier index. A Resource Block (RB or Physical Resource Block (PRB)) 108 is defined by Nsymb successive OFDM symbols 102 in the time domain and NRB successive subcarriers 110 in the frequency domain. Accordingly, one RB 108 consists of Nsymb×NRB REs 112.

In general, a minimum transmission unit of data corresponds to the RB unit. In the LTE system, Nsymb=7, NRB=12, and NBW and NRB are proportional to the bandwidth of the system transmission band. The data rate increases in proportion to the number of RBs scheduled to the UE. The LTE system defines and operates 6 transmission bandwidths.

In the case of an FDD system, in which the downlink and the uplink are divided by the frequency, a downlink transmission bandwidth and an uplink transmission bandwidth may be different from each other. A channel bandwidth refers to an RF bandwidth corresponding to a system transmission bandwidth. [Table 1] below shows the correspondence relationship between the system transmission bandwidth and the channel bandwidth defined in the LTE system. For example, the LTE system having a channel bandwidth of 10 MHz has a transmission bandwidth of 50 RBs.

TABLE 1

| | Channel bandwidth BWChannel [MHz] | | | | | |
|---|---|---|---|---|---|---|
| | 1.4 | 3 | 5 | 10 | 15 | 20 |
| Transmission bandwidth configuration NRB | 6 | 15 | 25 | 50 | 75 | 100 |

Downlink control information is transmitted within initial N OFDM symbols within the subframe. In general, N={1, 2, 3}. Accordingly, N varies in every subframe depending on the amount of control information to be transmitted to the current subframe. The control information includes a control channel transmission interval indicator indicating the number of OFDM symbols over which the control information is transmitted, scheduling information of downlink data or uplink data, and a Hybrid Automatic Retransmit Request (HARQ) response (ACK/NACK) signal.

A modulation scheme supported by the LTE system is one of Quadrature Phase Shift Keying (QPSK), 16 Quadrature Amplitude Modulation (QAM), and 64QAM, and modulation orders (Qm) thereof correspond to 2, 4, and 6, respectively. That is, the BS may transmit 2 bits per symbol in the QPSK modulation, 4 bits per symbol in the 16QAM, and 6 bits per symbol in the 64QAM.

The UE completes synchronization with the BS through a PSS and an SSS transmitted by the BS in a process of initially accessing the BS. The UE, having completed the synchronization with the BS, receives a Master Information Block (MIB) and a System Information Block (SIB) transmitted by the BS and acquires broadcast information required for communication with the BS in the future. Since the BS is not aware of the presence of the UE until this stage, the UE performs a random access procedure to access the BS in the future.

The LTE system operating as described above may support a low-cost/low-complexity UE by restricting some functions of the UE. It is expected that the low-cost UE is suitable for an MTC or M2M service that mainly aims to provide a remote meter-reading service, a crime-prevention service, or a distribution service. Further, it is expected that the low-cost UE is means to implement IoT.

For low cost and low complexity, it is possible to reduce the cost of an RF device of the UE by limiting the number of reception antennas of the UE to one or to reduce the cost of a data reception soft buffer of the UE by defining a maximum Transport Block Size (TBS) that the low-cost UE can process. In the general LTE system, while the UE may have a broadband signal transmission/reception function in a minimum of a 20 MHz band regardless of the bandwidth of a system transmission band, the low-cost UE may limit the maximum bandwidth to be narrower than 20 MHz so as to additionally implement low cost and low complexity. For example, in the LTE system of the channel bandwidth of 20 MHz, the operation of the low-cost UE that supports only a channel bandwidth of 1.4 MHz may be defined.

The low-cost UE may have low mobility according to MTC/M2M service or IoT service, but may be located in a shaded area of a building that a person cannot reach. In this case, a method of improving a communication coverage is needed.

In the current 3GPP LTE standardization process, it is assumed that the UE required to improve the communication coverage needs an improvement of communication coverage of 15 dB compared to the existing UE, and repeated transmission or bundling of the existing physical channel or a newly defined physical channel is considered to improve the communication coverage of the UE. The repeated transmission refers to transmission of a subframe including information to be transmitted several times, and the bundling means that the same information is transmitted through a plurality of subframes several times but is transmitted in different HARQ redundancy versions or in different physical channel formats in every subframe. Reception devices of the BS and the UE may acquire further improvement of the communication coverage compared to the physical channel through soft combining or accumulation of physical channel signals transmitted based on repetition or bundling. A level of repetition required to improve the communication coverage may be different according to each physical channel used for the uplink and downlink, and each UE may simultaneously have different values. The level of repetition may indicate the number of repetitions of the physical subframe, or may indicate a level for the number of repetitions actually used. Hereinafter, if only one of the repetition and the bundling is mentioned in connection with the improvement of the communication coverage in a similar way, it is considered that both the repetition and the bundling are included. Further, although the improvement of the communication coverage is being discussed based on the low-cost UE in the 3GPP standardization process, the method and the apparatus for receiving broadcast information to improve the communication coverage by the UE according to an embodiment of the present disclosure may be identically applied to all UEs for which an improvement in communication coverage is required since it is assumed that the general UE for which an improvement in communication coverage is required can also acquire the improvement of the communication coverage in the same way.

[Table 2] below shows the performance gain of a Physical Broadcast Channel (PBCH) required by the LTE-based-low-cost UE to acquire an improvement of communication coverage of 15 dB or higher in comparison with LTE category 1 UE. The PBCH is a physical channel for transmitting an MIB including broadcast information required by the BS for initial access and communication of the UE.

TABLE 2

| | PUSCH | PBCH |
|---|---|---|
| MCL for normal LTE | 140.7 dB | 149.0 dB |
| MCL target for MTC UE | 155.7 dB | 155.7 dB |
| Required enhancement to reach 15 dB for New complexity UEs(1 Rx) | 19 dB | 10.7 dB |

In [Table 2], a Maximum Coupling Loss (MCL) is a maximum loss value available for performing communication between a transmission device and a reception device. Communication is possible only when path attenuation between the transmission device and the reception device or various hardware losses are smaller than the MCL value shown in [Table 2]. Since the LTE system has the lowest MCL value of a Physical Uplink Shared Channel (PUSCH) used by the UE for transmitting data to the BS, the communication coverage of the PUSCH is relatively small in comparison with other channels. Accordingly, in order to improve the communication coverage of the low-cost UE by 15 dB compared to a conventional category 1 UE, a 15 dB improvement is required from the MCL of the PUSCH. For this reason, the MCL required for improving the communication coverage of the PUSCH of the low-cost UE is 155.7 dB, and should be designed such that all channels equally satisfy an MCL criterion of 155.7 dB.

Referring to [Table 2], a PBCH of the category 1 UE requires a performance gain of 6.7 dB in order to satisfy the MCL of 155.7 dB. While the category 1 UE has two reception antennas, the low-cost UE has a single reception antenna. Accordingly, the low-cost UE cannot acquire an antenna gain and a diversity gain, and thus requires an additional performance gain. When it is assumed that the antenna gain and the diversity gain are about 3 to 4 dB, the low-cost UE requires a total performance gain of 10.7 dB for the PBCH to improve the communication coverage of 15 dB in comparison with the category 1 UE.

Figure 2:
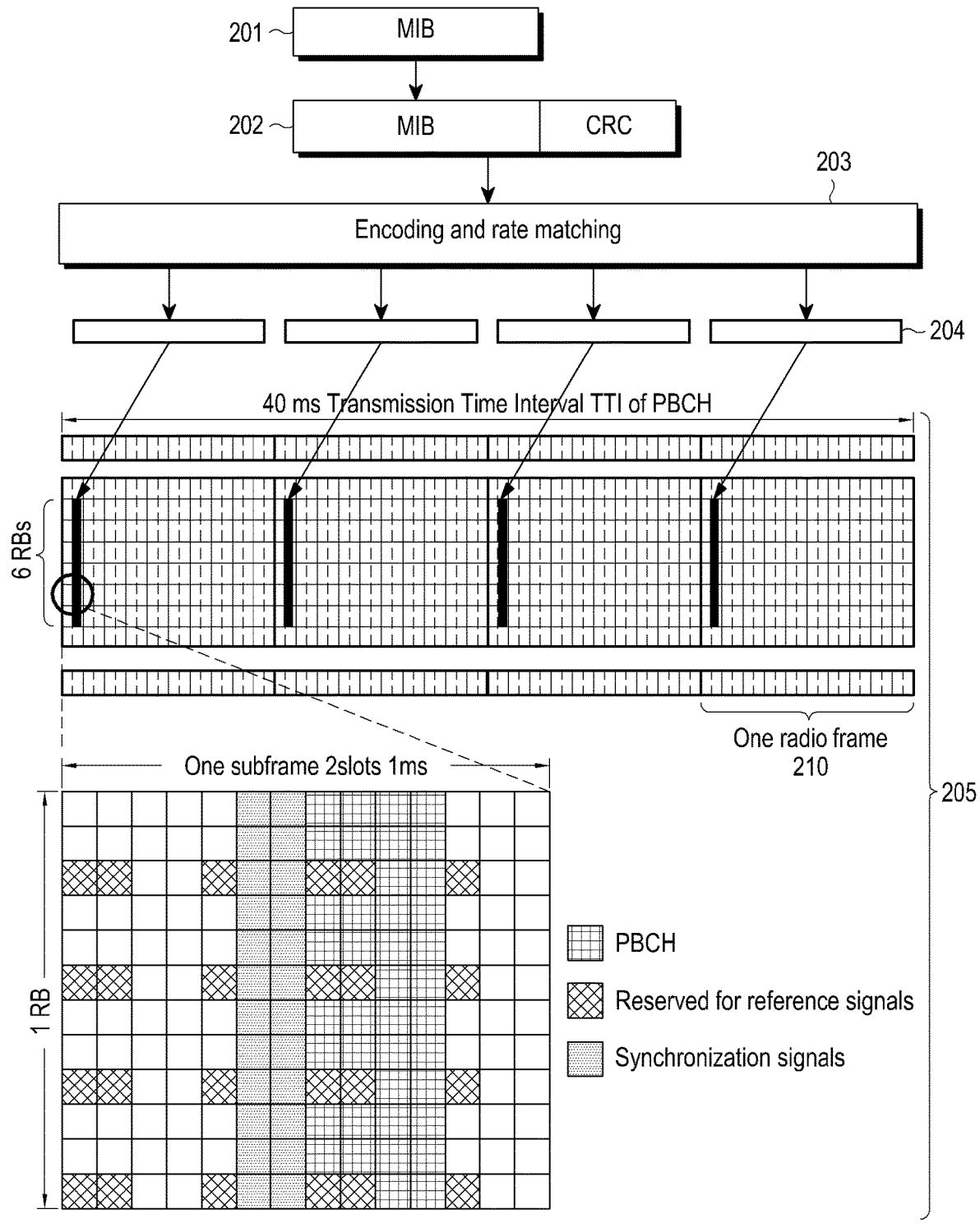
FIG. 2 illustrates a method by which a BS transmits broadcast information to a UE using a PBCH in a communication system to which an embodiment of the present disclosure is applied.

FIG. 2 illustrates a method by which the BS transmits broadcast information to the UE through the PBCH in a communication system to which an embodiment of the present disclosure is applied.

Referring to FIG. 2, the BS generates one MIB that consists of 24 bits and includes broadcast information required for initial access of the UE as indicated by reference numeral 201. The MIB includes downlink system bandwidth information of 3 bits, physical HARQ Indicator Channel (PHICH) configuration information of 3 bits, and a System Frame Number (SFN) of 8 bits, and further includes 10 reserved bits. A description of each field of the MIB will be made below in detail with reference to FIG. 5.

The BS generates a total of 40 bits of an MIB bit sequence by adding Cyclic Redundancy Check (CRC) bits of 16 bits to the MIB of 24 bits. The CRC bits serve to identify whether there is an erroneous bit in the MIB of 24 bits in the MIB bit sequence that the UE receives from the BS. For example, the BS determines the CRC bits by performing an exclusive OR operation on the remaining bit sequence, which is generated by dividing the MIB of 24 bits by a predefined 16th-order generator polynomial, and a mask bit sequence, which is determined according to the number of antenna ports used by the BS for PBCH transmission. With respect to the MIB of 24 bits received from the BS, the UE determines the CRC bits in the same way as the BS. Further, the UE compares the determined CRC bits and the received CRC bits. The UE determines that there is no error in the received MIB of 24 bits when the two CRC bits are the same as each other, and determines that there is an error in the received MIB of 24 bits when the two CRC bits are not the same as each other. At this time, since the UE is not aware of the number of antenna ports used by the BS for PBCH transmission at the time point at which the UE receives the MIB bit sequence from the BS, the UE should receive the PBCH through a combination of all antenna ports. That is, the UE should compare the determined CRC bits and the received CRC bits through the mask bit sequence corresponding to all antenna ports.

Thereafter, the BS performs channel encoding and rate matching in order to transmit the MIB bit sequence as indicated by reference numeral 203. In process 203 of performing the channel encoding and the rate matching, the MIB bit sequence of 40 bits is encoded by a Tail-Biting Convolutional Code (TBCC) having a coding rate of ⅓ and then properly rate-matched according to the number of REs used for PBCH transmission. Through the channel encoding and rate matching process, the BS may be robust to errors that may occur while the BS transmits the PBCH to the UE. Channel-encoding bits used for the channel-encoding process consist of a total of 1920 bits in the case of a system using a normal Cyclic Prefix (CP) and consist of 1760 bits in the case of a system using extended CP.

Accordingly, the BS segments the channel encoding bits consisting of 1920 bits or 1760 bits into four bit sequences, as indicated by reference numeral 204. Further, the BS transmits the four segmented MIB bit sequences to the UE through the PBCH during 40 ms as indicated by reference numeral 205. At this time, the PBCH is transmitted in a first subframe of each of four radio frames 210 belonging to 40 ms. The PBCH is mapped to six RBs on the frequency and is mapped to the first four OFDM symbols of a second slot on the time domain in the case of a BS using Frequency-Division Duplexing (FDD) and normal CP. Further, the four bit sequences are sequentially transmitted through four PBCHs during 40 ms.

In addition, each of the four bit sequences is scrambled to a scrambling sequence. At this time, a scrambling sequence generator is initialized to an inherent cell number (cell ID) every 40 ms. The PBCHs transmitted in respective radio frames use different scrambling sequences, so that the UE may descramble the PBCH received in one radio frame to four different scramble sequences and then decode the PBCH. When there is no error after checking the CRC bits, the UE may become aware of a reception time point within 40 ms. Further, when the UE is not close to the BS and thus the reception power thereof is not sufficient, the UE may identify the MIB by receiving all four PBCH signals and then decoding the channel signals through a combining process. In addition, when there is no error in the decoded MIB, the UE may acquire downlink system frequency information, PHICH configuration information, and SFN information included in the MIB and communicate with the BS based on the acquired broadcast information.

As described with reference to FIG. 2, the BS periodically transmits the MIB including the same broadcast information through the PBCH in four radio frames for 40 ms. However, since the SFN field value in the information included in the MIB increases by 1 every four radio frames, the communication coverage can be improved by combining PBCH signals received after the four radio frames. Accordingly, for the low-cost UE, in current 3GPP LTE standards, MTC-PBCHs for repeatedly transmitting more PBCHs within four radio frames are being discussed.

Figure 3:
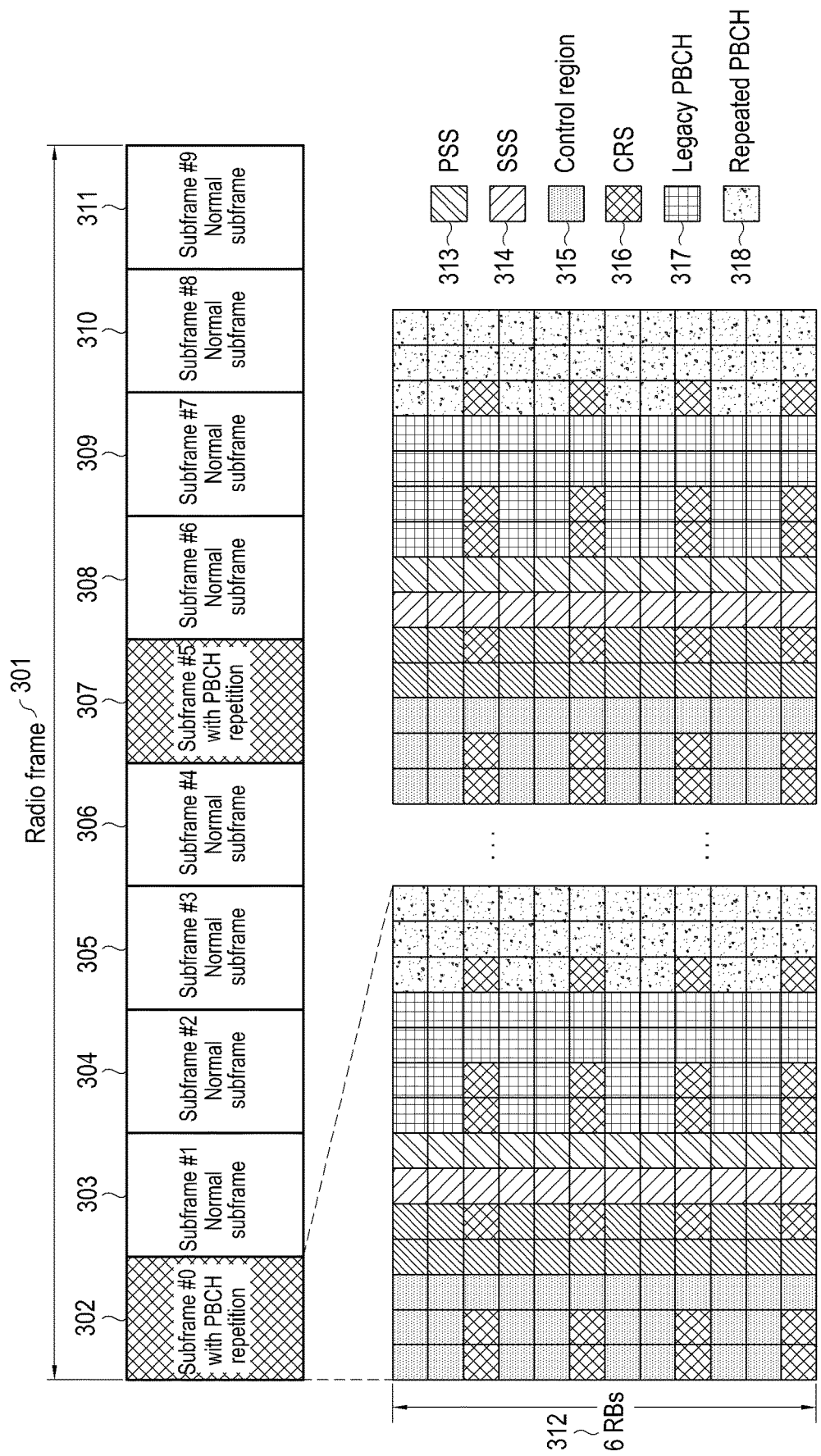
FIG. 3 illustrates a structure in which a PBCH is repeatedly transmitted in the communication system to which an embodiment of the present disclosure is applied.

FIG. 3 illustrates a structure in which the PBCH is repeatedly transmitted in a communication system to which an embodiment of the present disclosure is applied, that is, an embodiment of the structure of repeatedly transmitting the PBCH, considered in the 3GPP LTE in order to improve the PBCH communication coverage of the low-cost UE.

In FIG. 3, one radio frame 301 consists of 10 subframes 302, 303, 304, 305, 306, 307, 308, 309, 310, and 311. For the low-cost UE, the MTC-PBCH is configured to transmit the PBCH in two subframes of one radio frame, unlike the conventional system. FIG. 3 illustrates a structure in which the PBCH is transmitted in a first subframe 302 and a sixth subframe 307 as an example for transmitting the PBCH in two subframes of one radio frame 301. Although FIG. 3 illustrates that the PBCH is transmitted in the first subframe 302 and the sixth subframe 307, an embodiment of the present disclosure is not limited to the PBCH transmission in a particular subframe. Further, although it is assumed that two subframes within the radio frame are used for PBCH transmission in FIG. 3, an embodiment of the present disclosure is not limited to the case in which the number of subframes in which the PBCH is repeated is two. In a first subframe 302 and a sixth subframe 307 of FIG. 3 for transmitting the PBCH, in addition to a legacy PBCH 317, the remaining REs except for RE regions for a PSS 313, an SSS 314, a control signal area 315, and a CRS 316 within six RBs 312 may be used for repeated transmission 318.

Accordingly, in the case of an PDD system using a normal CP, the BS may transmit the PBCH to the low-cost UE in one radio frame a total of 4.6 times. Therefore, the low-cost UE may acquire an improvement of communication coverage of about 6.6 dB compared to the PBCH transmitted once every radio frame.

As mentioned in [Table 2] above, in order to acquire an improvement of communication coverage of the low-cost UE corresponding to 15 dB, the PBCH is required to improve the communication coverage of a total of 10.7 dB, but only an improvement of the communication coverage of 6.6 dB can be acquired using the PBCH that the BS repeatedly transmits to the low-cost UE at present, meaning that sufficient communication coverage improvement cannot be acquired. In the current 3GPP LTE standardization for the low-cost UE, it is assumed that an insufficient communication coverage performance gain can be acquired using time diversity. That is, when a channel becomes better and thus gain attributable to the channel can be acquired even though the communication coverage of the low-cost UE is lacking, it is expected that PBCH decoding is possible. However, since the low-cost UE for which an improvement of communication coverage at a high level is required is a fixed sensor or a mounted communication UE located in a heavily shaded area such as a basement of a building, a change in the channel in which the UE exists is relatively slow, and accordingly it is difficult to acquire time diversity through a change in channel gain according to time. Accordingly, the time used for MIB decoding by the UE required to improve the communication coverage at a high level increases, which causes a problem of reducing a usable battery time by increasing the power consumption of the UE.

As described above, when the communication coverage improvement level of the UE is high even though the low-cost UE required to improve the communication coverage uses the repeated PBCH for the improvement of the communication coverage, it is difficult to perform the MIB decoding. Accordingly, an embodiment of the present disclosure proposes a method and an apparatus of receiving broadcast information to acquire the improvement of the communication coverage during an initial access process of the UE required to improve the communication coverage.

Hereinafter, the BS is a subject that allocates resources to the UE and may be one of an eNode B, a Node B, a Base Station (BS), a radio access unit, a base station controller, and a node on a network. The UE may include a User Equipment (UE), a Mobile Station (MS), a cellular phone, a smart phone, a computer, and a multimedia system capable of performing a communication function. In an embodiment of the present disclosure, the term "downlink" refers to a radio transmission path of a signal that the BS transmits to the UE, and the term "uplink" refers to a radio transmission path of a signal that the UE transmits to the BS. Further, hereinafter, although the LTE or LTE-A system will be described as an example in an embodiment of the present disclosure, the embodiment of the present disclosure may be applied to other communication systems having a similar technical background or channel form. In addition, the embodiment of the present disclosure may be applied to other communication systems through some modifications without departing from the scope of the present disclosure based on the determination of those skilled in the art.

Figure 4:
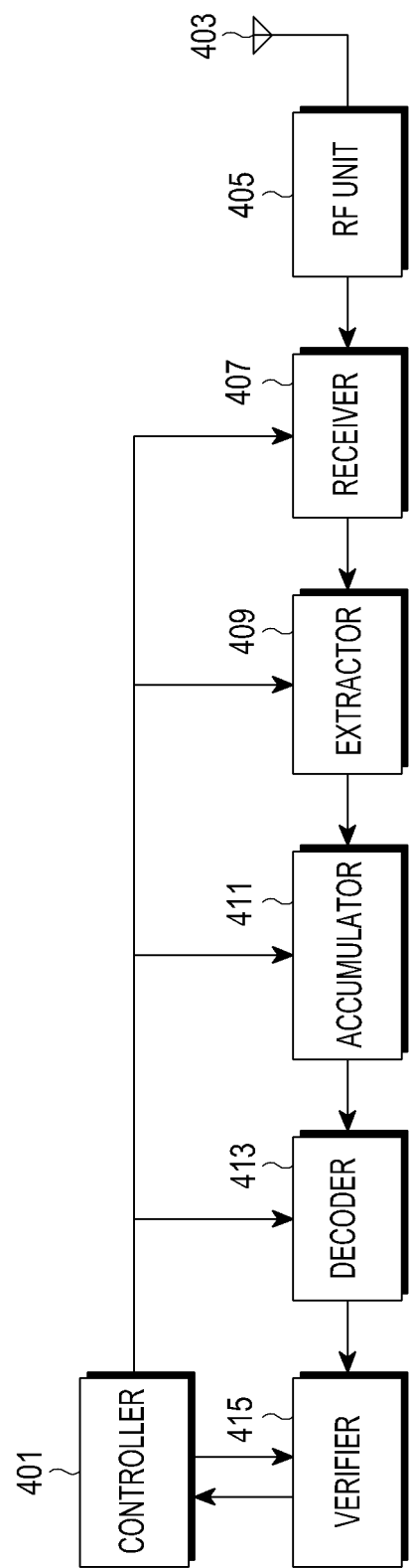
FIG. 4 schematically illustrates an example of a device for receiving broadcast information in the communication system according to an embodiment of the present disclosure.

FIG. 4 schematically illustrates an example of a device for receiving broadcast information in a communication system according to an embodiment of the present disclosure.

Referring to FIG. 4, it is assumed that the device for receiving broadcast information in the communication system according to an embodiment of the present disclosure is a low-cost UE, the communication coverage of which is required. Although, for convenience of description, it is assumed that the device for receiving broadcast information is a low-cost UE, the communication coverage of which is required in FIG. 4, an embodiment of the present disclosure can be applied to all UEs for which communication coverage is determined to be required. The UE may determine whether an improvement of the communication coverage is required by performing synchronization and cell search based on a PSS and an SSS received from the BS. For example, when the time used for the synchronization and the cell search is longer than a time set by the BS or a preset time, the UE may determine that an improvement in communication coverage is required. In another example, when the UE calculates received signal power through the PSS/SSS or a CRS and the received signal power is lower than a threshold value set by the BS or a preset threshold value, the UE may determine that the improvement in communication coverage is required.

Hereinafter, an embodiment of the present disclosure describes operations after the UE determines that an improvement in communication coverage is required. Meanwhile, when the UE does not require an improvement in communication coverage, broadcast information may be received through the conventional method.

Referring to FIG. 4, the reception device according to an embodiment of the present disclosure includes a controller 401, an antenna 403, an RF unit 405, a receiver 407, an extractor 409, an accumulator 411, a decoder 413, and a verifier 415.

The controller 401 controls the flow of the overall operation of the receiver 407, the extractor 409, the accumulator 411, the decoder 413, and the verifier 415 according to an embodiment of the present disclosure.

The RF unit 405 down-coverts a signal transmitted from the BS through the antenna 403 into a baseband signal. The receiver 407 demodulates the converted baseband signal to convert it into a frequency domain signal.

The extractor 409 extracts a PBCH signal from a location at which the PBCH signal is mapped in time and frequency domains of the converted frequency domain signal and transmits the extracted PBCH signal to the accumulator 411. At this time, the location at which the PBCH signal is mapped corresponds to information preset between the BS and the UE in the communication system according to first to third embodiments of the present disclosure. The UE may extract, at least once, the PBCH signals including the same MIB information on the period of 1024 radio frames for 40 ms according to the first and third embodiments of the present disclosure. The accumulator 411 receives the PBCH signals received every 1024 radio frames from the extractor 409 and combines the PBCH signals received during a preset time interval. The number of accumulators 411 and extractors 409 within the reception device according to an embodiment proposed by the present disclosure may be plural, which will be described in detail with reference to FIG. 7. The operation of the extractors 409 and the accumulators 411 according to the first to third embodiments of the present disclosure will be described in detail with reference to FIGS. 5 to 8 below.

The decoder 413 decodes the combined PBCH signals received from the accumulator 411, outputs an MIB bit sequence, and transmit the MIB bit sequence to the verifier 415. The verifier 415 identifies whether there is an erroneous bit in the MIB of 24 bits included in the decoded MIB bit sequence based on 16 CRC bits included in the decoded MIB bit sequence. That is, the verifier 415 determines the CRC bits from the MIB of 24 bits included in the decoded MIB bit sequence and identifies whether the 16 CRC bits included in the decoded MIB bit sequence are the same as the determined CRC bits. When the 16 CRC bits included in the decoded MIB bit sequence are the same as the determined CRC bits, the verifier 415 transmits information indicating that the MIB of 24 bits included in the decoded MIB bit sequence is valid to the controller 401. On the other hand, when the 16 CRC bits included in the decoded MIB bit sequence are not the same as the determined CRC bits, the verifier 415 transmits information indicating that the MIB of 24 bits included in the decoded MIB bit sequence is not valid to the controller 401.

Upon receiving the information indicating that the MIB of 24 bits included in the decoded MIB bit sequence is valid from the verifier 415, the controller 401 identifies broadcast information included in the MIB of 24 bits and communicates with the BS based on the identified broadcast information. On the other hand, when receiving the information indicating that the MIB of 24 bits included in the decoded MIB bit sequence is not valid from the verifier 415, the controller 401 identifies whether an initial signal is transmitted again from the BS through the receiver 407.

Figure 5:
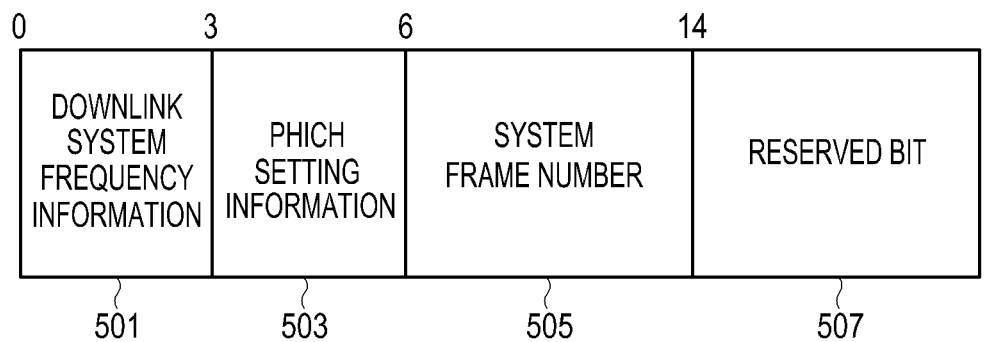
FIG. 5 illustrates in detail fields included in an MIB according to an embodiment of the present disclosure.

The MIB of 24 bits identified by the controller 401 is configured as shown in FIG. 5.

Meanwhile, although FIG. 4 illustrates that the reception device is implemented by separate units, such as the controller 401, the antenna 403, the RF unit 405, the receiver 407, the extractor 409, the accumulator 411, the decoder 413, and the verifier 415, the reception device can be implemented in the form of a combination of at least two of the controller 401, the antenna 403, the RF unit 405, the receiver 407, the extractor 409, the accumulator 411, the decoder 413, and the verifier 415. Further, the reception device can be implemented by one processor.

FIG. 5 schematically illustrates the structure of an MIB in a communication system according to an embodiment of the present disclosure.

Referring to FIG. 5, the MIB includes a downlink system frequency information field 501, a PHICH configuration information field 503, a system frame number field 505, and a reserved bit field 507, and is implemented, for example, using a total of 24 bits. The downlink system frequency information field 501 has, for example, a size of 3 bits and includes information on the size of a downlink frequency used by the BS. The PHICH configuration information field 503 may include information for receiving an HARQ response to the PUSCH by the UE, and, for example, may be implemented by 3 bits. The system frame number field 505 includes a system frame number of the system frame to which the current radio frame belongs. The system frame number of the system frame to which the radio frame belongs may have, for example, a value ranging from 0 to 1023, and accordingly, may be expressed by a total of 10 bits. However, a system frame number included in the MIB may include only higher 8 bits among the 10 bits, and the value of the remaining lower 2 bits may be detected using a difference of a scrambling sequence used by the UE for scrambling the PBCH every radio frame. The system frame number of the MIB is a value that increases by 1 every four radio frames, and changes every 40 ms. The reserved bit field 507 includes a value reserved for future and is not used for any purpose at present.

Hereinafter, the operation of the extractor 409 and the accumulator 411 in the reception device according to an embodiment of the present disclosure will be described in detail.

According to an embodiment of the present disclosure, in order to acquire a performance gain by extracting and combining PBCH signals for transmitting MIBs for a long time, the extractor 409 and the accumulator 411 should extract a plurality of PBCH signals for transmitting MIBs including the same broadcast information and combine the plurality of extracted PBCH signals. When the extractor 409 and the accumulator 411 extract a plurality of PBCH signals for transmitting MIBs including different pieces of information, a gain corresponding to an increase in a Signal to Noise Ratio (SNR) according to the combining cannot be acquired since a change in PBCH signals (that is, physical signals) according to changed information cannot be coherently accumulated. Accordingly, the extractor 409 and the accumulator 411 may acquire the communication coverage gain merely by extracting and combining PBCH signals within a period in which information included in the MIB is not changed.

The remaining information (that is, the downlink system frequency information, the PHICH configuration information, and the reserved bit), except for the system frame number in the fields of the MIB of FIG. 5, may be setting values dependent on the BS system, and setting values according to specifications of one BS may be defined so as not to be changed dynamically. However, the system frame number is changed every adjacent four radio frames, so that the PBCH signals cannot be combined successively in the unit of adjacent radio frames. However, the system frame number corresponds to 10 bits and thus has a range from 0 to 1023, and the remaining information corresponds to a value that is not dynamically changed and is dependent on the BS system, and thus has MIBs having the same broadcast information every 1024 radio frames. Accordingly, the UE according to an embodiment of the present disclosure may acquire a communication coverage gain by extracting and combining at least one PBCH signal every 1024 radio frames within 40 ms. Embodiments of the present disclosure may be divided into first to third embodiments depending on the number of PBCH signals extracted from 1024 radio frames.

Figure 6:
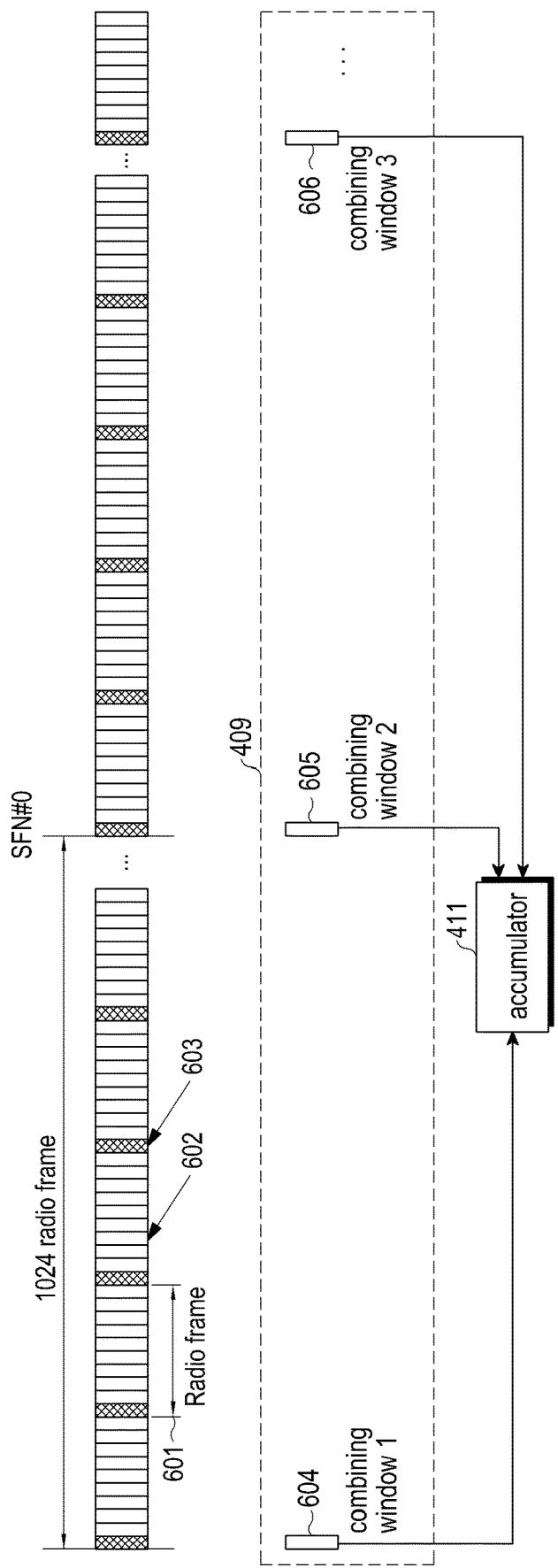
FIG. 6 illustrates a method by which a reception device extracts and combines PBCH signals according to a first embodiment of the present disclosure.

FIG. 6 illustrates a method of extracting and combining PBCH signals by the reception device according to the first embodiment of the present disclosure. In the first embodiment of the present disclosure, when the predetermined number of windows for extracting PBCH signals from 1024 radio frames is one, the UE extracts one PBCH signal every 1024 radio frames and combines the PBCH signal extracted every 1024 radio frames during 40 ms.

Referring to FIG. 6, one radio frame 601 consists of 10 subframes 602. Since the MIB includes the same broadcast information in every 1024 radio frames, the UE may achieve a communication coverage improvement by extracting and combining the PBCH signals transmitted at intervals of 1024 radio frames.

To this end, the controller 401 according to the first embodiment of the present disclosure sets the number of combining windows for extracting PBCH signals from 1024 radio frames as one. That is, when a first subframe of a predetermined radio frame is set as the combining window, the controller 401 sets a plurality of combining windows to extract PBCH signals every 1024 radio frames based on the set combining window.

The extractor 409 extracts the PBCH from the subframe corresponding to each of the plurality of combining windows set according to the control of the controller 401.

For example, in FIG. 6, when combining window #1 604, combining window #2 605, and combining window #3 606 are set as windows for extracting PBCH signals, the extractor 409 extracts the PBCH signal from the subframe corresponding to each of the combining window #1 604, the combining window #2 605, and the combining window #3 606 separated at intervals of 1024 radio frames and transmits the extracted PBCH signal to the accumulator 411. The accumulator 411 combines a plurality of PBCH signals received from the extractor 409 and transmits the combined PBCH signal to the decoder 413 of FIG. 4. At this time, the accumulator 411 may combine the plurality of PBCH signals at a symbol level or at a soft bit level.

Meanwhile, although FIG. 6 illustrates the method of extracting and combining three PBCH signals as an example, the combining can be performed regardless of the number of PBCH signals since the same PBCH signal is transmitted every 1024 radio frames.

The first embodiment of the present disclosure has an advantage in that combining is performed after one PBCH signal is extracted from every 1024 radio frames so that the size of a buffer for storing the extracted PBCH signals is relatively small and UE complexity can be reduced, but also has a disadvantage in that a delay time (time latency), during which the UE initially accesses the BS, relatively increases.

Accordingly, the second and third embodiments of the present disclosure propose a method of extracting a plurality of PBCH signals from 1024 radio frames.

Figure 7:
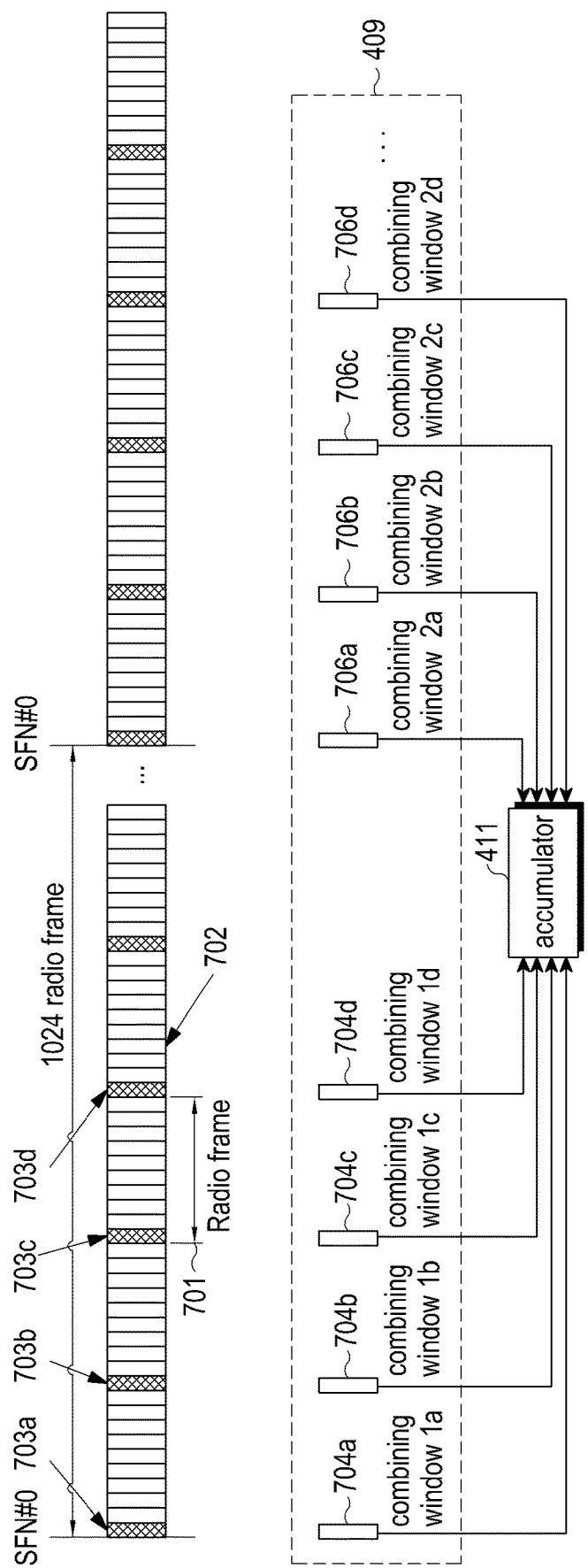
FIG. 7 illustrates a method by which the reception device extracts and combines PBCH signals according to a second embodiment of the present disclosure.

FIG. 7 illustrates a method of extracting and combining PBCH signals by the reception device according to the second embodiment of the present disclosure. In the second embodiment of the present disclosure, the UE uses the presence of PBCH signals for MIBs including the same broadcast information during four successive radio frames. That is, in the second embodiment of the present disclosure, when the predetermined number of windows for extracting PBCH signals from 1024 radio frames is four, the UE extracts four PBCH signals in every 1024 radio frames and combines the PBCH signals extracted every 1024 radio frames during 40 ms.

Referring to FIG. 7, one radio frame 701 consists of 10 subframes 702, and includes a PBCH signal for an MIB including the same broadcast information in subframe #0 703a, 703b, 703c, or 703d of each of the four radio frames.

When a first subframe of a predetermined radio frame is set as a combining window, the controller 401 according to the second embodiment of the present disclosure sets first subframes of four successive radio frames as the combining windows based on the set combining window. That is, the controller 401 sets the four combining windows to be located at intervals of one radio frame. Thereafter, the extractor 409 extracts the PBCH signal from the subframe corresponding to each of the four combining windows set in every 1024 radio frames under the control of the controller 401.

For example, in FIG. 7, when combining windows #1a 704a, #1b 704b, #1c 704c, and #1d 704d and combining windows #2a 706a, #2b 706b, #2c 706c, and #2d 706d are set as windows for extracting PBCH signals, the extractor 409 extracts the PBCH signal from the subframe corresponding to each of the combining windows set in every 1024 radio frame and transmits the extracted PBCH signals to the accumulator 411. The accumulator 411 combines the PBCH signals received from the extractor 409 and transmits the combined PBCH signal to the MIB decoder 413 of FIG. 4. At this time, the accumulator 411 may combine the plurality of PBCH signals at a symbol level or at a soft bit level.

Meanwhile, although FIG. 7 illustrates the method of performing combining through two combining window sets 604a, 604b, 604c, and 604d, and 606a, 606b, 606c, and 606d, which are separated at intervals of 1024 radio frames as an example, the combining can be performed every 1024 radio frames regardless of the number of PBCH signals since the same PBCH signal is always transmitted every 1024 radio frames.

When all the PBCH signals transmitted in the four radio frames in the unit of four successive radio frames are combined as described in the second embodiment of the present disclosure, decoding may be successful when the location at which the first combining window 704a starts becomes the radio frame corresponding to (SFN mod 4)=0. That is, the decoding is successful only when the first combining window 704a matches the radio frame, the system frame number included in the MIB of which is changed. That is, since the decoder 413 finds the start location of the unit of four radio frames through blind decoding without any information, the UE extracts and combines PBCHs with four extractors 409 having different start locations of the first combining window 704a by the unit of one radio frame and accumulators 411 corresponding to the extractors 409, performs the PBCH decoding for four combining values, determines that one MIB in which the PBCH decoding is successfully performed among the four PBCH decodings is the MIB transmitted by the BS, and refers to a system frame location corresponding to the extractor 409 and the accumulator 411 corresponding thereto.

In the second embodiment of the present disclosure, a plurality of PBCH signals is combined during four successive radio frames, so that there is an advantage in that the time latency for which the UE initially accesses the BS can be reduced and thus RF power consumption of the UE can be also reduced even though UE complexity increases. Meanwhile, according to the structure of the communication system, the embodiment of the present disclosure can be applied to the case in which the same broadcast information is transmitted in non-successive radio frames.

As described in the example of FIG. 3, the BS supporting the low-cost UE repeatedly transmits the current PBCH signal (that is, transmits the MTC-PBCH signal) to improve the communication coverage environment. However, when the improvement of communication coverage is lacking in spite of the MTC-PBCH signal of FIG. 3 according to the location of the UE or a channel state, the reception communication coverage of the PBCH signal may be improved by applying both the first embodiment and the second embodiment of the present disclosure. By applying the method proposed by the third embodiment of the present disclosure to the MTC-PBCH structure of FIG. 3, the UE may initially access the BS within a time shorter than that of the second embodiment.

Figure 8:
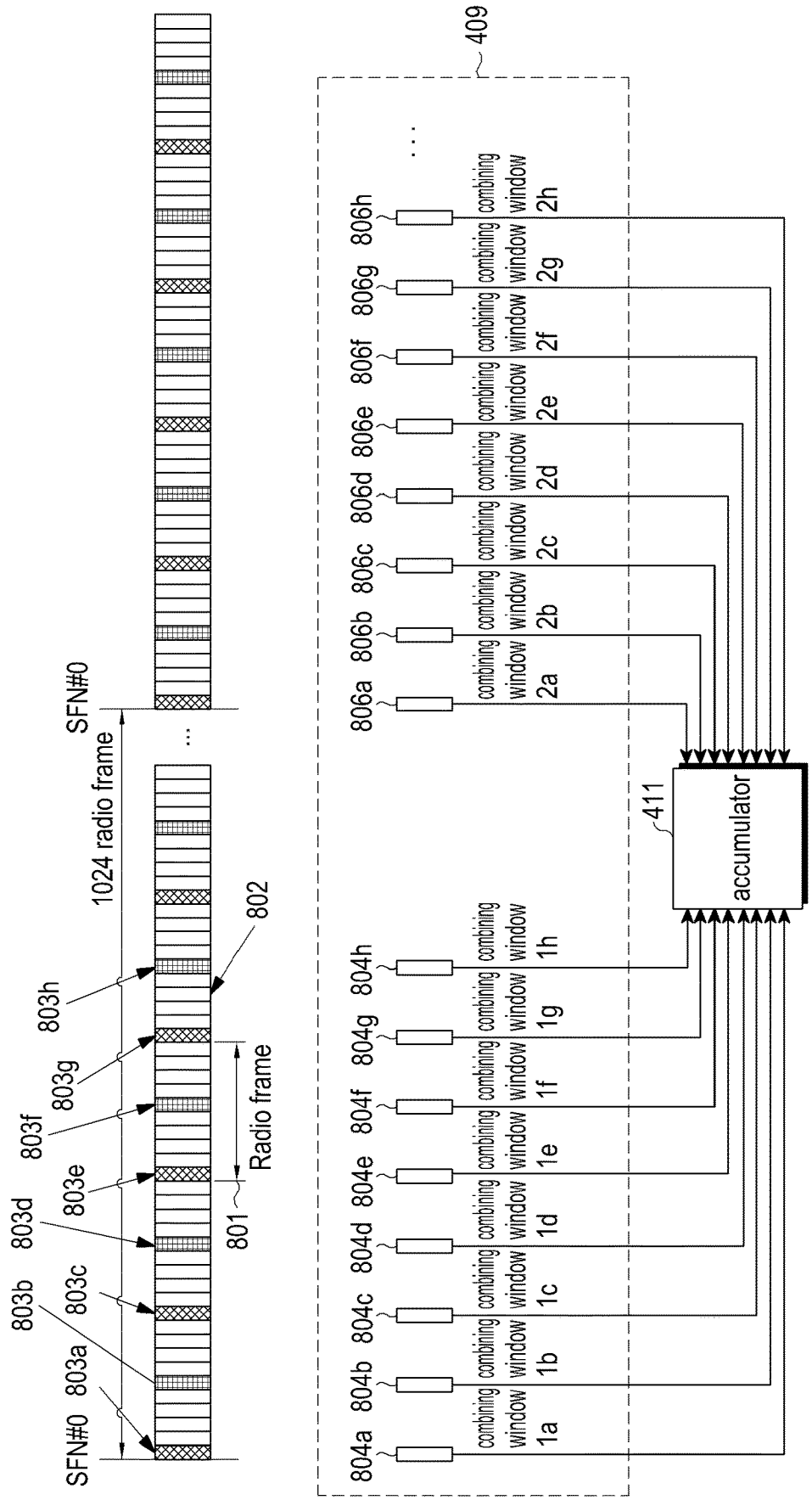
FIG. 8 illustrates a method by which the reception device extracts and combines PBCH signals according to a third embodiment of the present disclosure.

FIG. 8 illustrates a method of extracting and combining PBCH signals by the reception device according to the third embodiment of the present disclosure. In the third embodiment of the present disclosure, the UE uses the presence of PBCH signals for MIBs including the same broadcast information during 8 successive radio frames. That is, in the third embodiment of the present disclosure, when the predetermined number of windows for extracting PBCH signals from 1024 radio frames is 8, the UE extracts 8 PBCH signals every 1024 radio frames and combines the PBCH signals extracted every 1024 radio frames during 40 ms.

Since the remaining resource areas except for a control area in one subframe are all used for PBCH signal transmission in the third embodiment of the present disclosure, the PBCH signal is transmitted about twice in one radio frame and thus two PBCH signals may be extracted.

Referring to FIG. 8, one radio frame 801 consists of 10 subframes 802, and includes a PBCH signal for an MIB including the same broadcast information in subframe #0 803a, 803b, 803c, or 803d and subframe #5 803b, 803d, 803f, or 803h of each of the four radio frames.

When subframe #0 and subframe #5 included in a predetermined radio frame are set as combining windows, the controller 401 according to the third embodiment of the present disclosure sets subframes #0 and #5 of four successive radio frames as combining windows based on the set combining window. Thereafter, the extractor 409 extracts the PBCH signal from the subframe corresponding to each of the eight combining windows set every 1024 radio frame under the control of the controller 401.

For example, in FIG. 8, when windows 804a, 804b, 804c, 804d, 804e, 804f, 804g, 804h, 806a, 806b, 806c, 806d, 806e, 806f, 806g, and 806h are set as the windows for extracting PBCH signals, the extractor 409 extracts a PBCH signal from the subframe corresponding to each of the combining windows set in every 1024 radio frame and transmits the extracted PBCH signals to the accumulator 411. At this time, the 8 combining windows are located at intervals of 5 subframes. The accumulator 411 combines the PBCH signals received from the extractor 409 and transmits the combined PBCH signal to the MIB decoder 413 of FIG. 4. The accumulator 411 combines the plurality of PBCH signals at a symbol level or a soft bit level.

Meanwhile, although FIG. 8 illustrates the method of performing combining through two combining window sets #1a 804a, #1b 804b, #1c 804c, #1d 804d, #1e 804e, #1f 804f, #1g 804g, and #1h 804h, and #2a 806a, #2b 806b, #2c 806c, #2d 806d, #2e 806e, #2f 806f, #2g 806g, and #2h 806h, which are separated at intervals of 1024 radio frames as an example, the combining can be performed every 1024 radio frames regardless of the number of PBCH signals since the same PBCH signal is always transmitted every 1024 radio frames.

When all the PBCH signals transmitted in four radio frames in the unit of four successive radio frames are combined as described in the third embodiment of the present disclosure, decoding may be successful only when the location at which a first combining window starts matches a radio frame, the system frame number included in the MIB of which is changed. That is, since the decoder 413 finds a start location of the unit of four radio frames through blind decoding without any information, the UE extracts and combines PBCHs with four extractors 409 having different start locations of the first combining window 704a by the unit of one radio frame and accumulators 411 corresponding to the extractors 409, performs the PBCH decoding for four combining values, determines that one MIB in which the PBCH decoding is successfully performed among the four PBCH decodings is the MIB transmitted by the BS, and refers to a system frame location corresponding to the extractor 409 and the accumulator 411 corresponding thereto.

Figure 9:
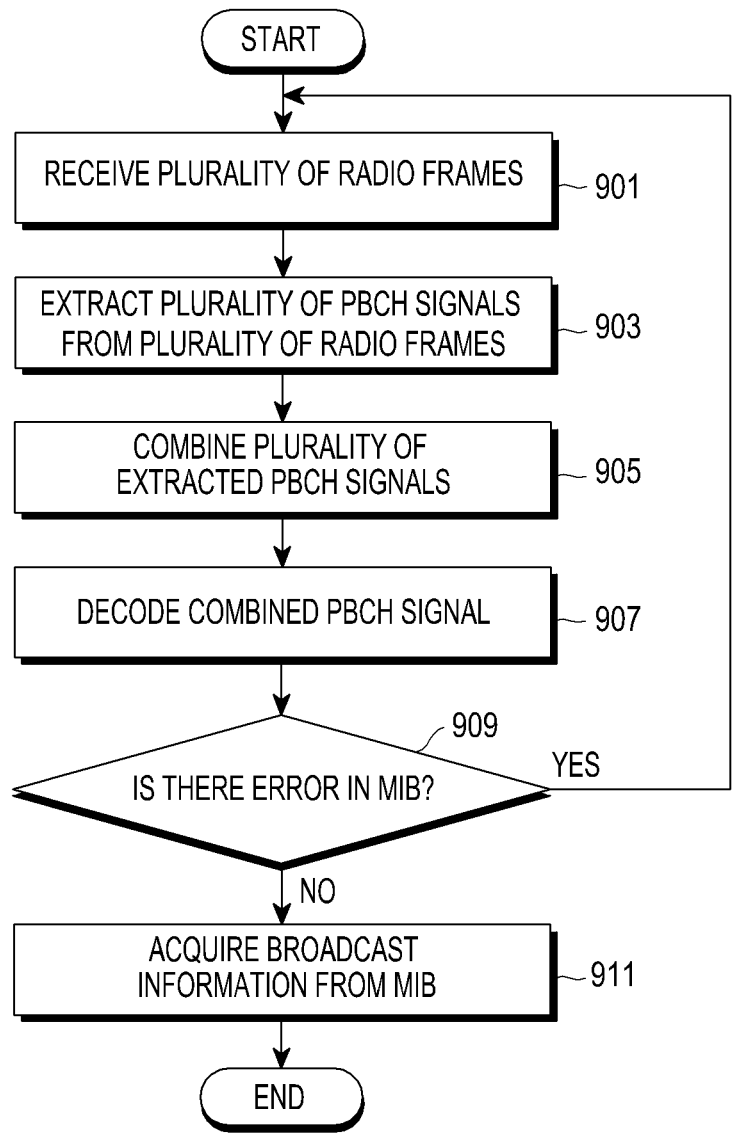
FIG. 9 illustrates a method of receiving broadcast information in the communication system according to an embodiment of the present disclosure.

FIG. 9 illustrates a method of receiving broadcast information in a communication system according to an embodiment of the present disclosure. At this time, it is assumed that a device for receiving the broadcast information in the communication system according to the embodiment of the present disclosure is a low-cost UE requiring improvement of the communication coverage. Although it is assumed that the device for receiving the broadcast information is the low-cost UE requiring improvement of the communication coverage, the embodiment of the present disclosure can be applied to all UEs determined to require an improvement in communication coverage. Hereinafter, operations after it is determined that the UE requires the improvement of the communication coverage will be described with reference to FIG. 9.

Referring to FIG. 9, the UE receives a plurality of radio frames from the BS in operation 901. The UE extracts at least one PBCH signal in every predetermined period (that is, every 1024 radio frames) in the plurality of received radio frames in operation 903. At this time, the number of at least one PBCH signal is determined according to at least one of the number of subframes to which PBCH signals corresponding to MIBs including the same broadcast information in 1024 radio frames are mapped and the preset number of windows for extracting PBCH signals in the corresponding system. That is, in the first embodiment of the present disclosure, when the preset number of windows for extracting the PBCH signals every 1024 radio frames is one, the UE extracts one PBCH signal every 1024 radio frames. In the second embodiment of the present disclosure, when the number of subframes to which PBCH signals for MIBs including the same broadcast information in 1024 radio frames are mapped is four (or when the preset number of windows for extracting PBCH signals every 1024 radio frames is four), the UE extracts four PBCH signals every 1024 radio frames. In the third embodiment of the present disclosure, when the number of subframes to which PBCH signals for MIBs including the same broadcast information in 1024 radio frames are mapped is eight (that is, when the preset number of windows for extracting PBCH signals every 1024 radio frames is eight), the UE extracts eight PBCH signals every 1024 radio frames.

The UE combines the plurality of extracted PBCH signals in operation 905. The UE decodes the combined PBCH signals and outputs an MIB bit sequence in operation 907. Thereafter, the UE identifies 16 CRC bits included in the output MIB bit sequence and determines whether there is an error in the MIB of 24 bits included in the output MIB bit sequence in operation 909. That is, the UE calculates CRC bits based on the MIB of 24 bits included in the output MIB bit sequence and compares the calculated CRC bits with the 16 CRC bits included in the output MIB bit sequence. The UE determines that there is no error in the MIB of 24 bits included in the output MIB bit sequence when the two CRC bits are the same as each other based on a result of the comparison, and determines that there is an error in the MIB of 24 bits included in the output MIB bit sequence when the two CRC bits are different from each other.

When it is determined that there is no error in the MIB of 24 bits included in the output MIB bit sequence, the UE acquires broadcast information from the MIB of 24 bits included in the output MIB bit sequence in operation 911. On the other hand, when it is determined that there is an error in the MIB of 24 bits included in the output MIB bit sequence, the UE attempts to receive a plurality of radio frames again in operation 901.

Next, another example of the internal structure of the device for receiving broadcast information in the communication system according to an embodiment of the present disclosure will be described with reference to FIG. 10.

Figure 10:
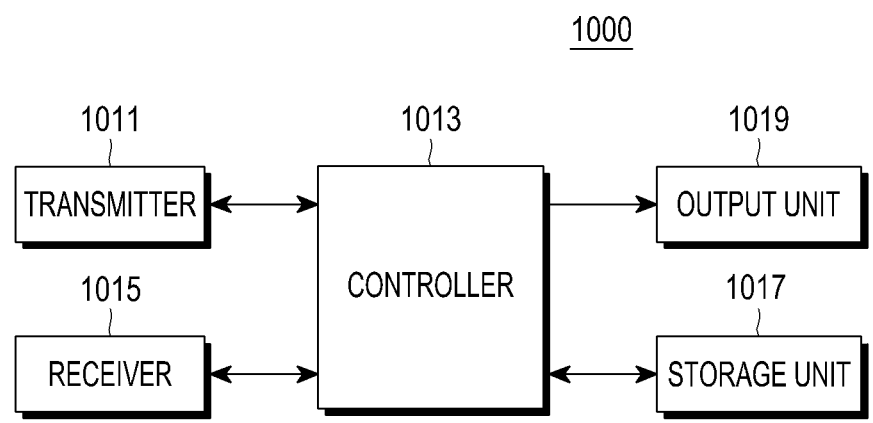
FIG. 10 schematically illustrates another example of an internal structure of the device for receiving broadcast information in the communication system according to an embodiment of the present disclosure.

FIG. 10 schematically illustrates another example of the internal structure of the device for receiving broadcast information in the communication system according to an embodiment of the present disclosure.

Referring to FIG. 10, a reception device 1000 includes a transmitter 1011, a controller 1013, a receiver 1015, a storage unit 1017, and an output unit 1019.

First, the controller 1013 controls the overall operation of the reception device 1000 and controls operations related to the operation of receiving broadcast information in the communication system according to an embodiment of the present disclosure. Since a description of the operations related to the operation of receiving broadcast information in the communication system according to an embodiment of the present disclosure is the same as that made in FIGS. 4 to 9, a detailed description thereof will be omitted.

The transmitter 1011 transmits various signals and various messages to other entities included in the communication system, for example, other entities such as a BS, under the control of the controller 1013. Since the various signals and the various messages transmitted by the transmitter 1011 are the same as those described in FIGS. 4 to 9, a detailed description thereof will be omitted herein.

Further, the receiver 1015 receives various signals and various messages from other entities included in the communication system, for example, other entities such as a BS, under the control of the controller 1013. Since the various signals and the various messages received by the receiver 1015 are the same as those described in FIGS. 4 to 9, a detailed description thereof will be omitted herein.

The storage unit 1017 stores programs and various types of data related to the operation of receiving broadcast information, performed in the communication system according to an embodiment of the present disclosure under the control of the controller 1013.

Further, the storage unit 1017 stores the various signals and various messages that the receiver 1015 receives from the different entities.

The output unit 1019 outputs various signals and various messages related to the operation of receiving broadcast information, performed by the reception device 1000 in the communication system according to an embodiment of the present disclosure under the control of the controller 1013. Since the various signals and various messages output by the output unit 1019 are the same as those described in FIGS. 4 to 9, a detailed description thereof will be omitted herein.

Meanwhile, although FIG. 10 illustrates that the reception device 1000 is implemented by separate units such as the transmitter 1011, the controller 1013, the receiver 1015, the storage unit 1017, and the output unit 1019, the reception device 1000 can be implemented in the form of a combination of at least two of the transmitter 1011, the controller 1013, the receiver 1015, the storage unit 1017, and the output unit 1019. Further, the reception device 1000 may be implemented by a single processor.

The UE according to an embodiment of the present disclosure is located in a heavily shaded area such as a basement of a building and thus is required to improve the communication coverage thereof, but may efficiently receive broadcast information even though the status of a channel in which the UE currently exists is not good and sufficient gain is not acquired. The UE according to an embodiment of the present disclosure may simultaneously reduce a delay time of initial access to the BS and power consumption, thereby increasing a battery use time.

Although the present disclosure describes a new embodiment of the present disclosure required according to improvement of the communication coverage of the low-cost UE, the embodiment of the present disclosure is not limited to the low-cost UE, and may be used for a general LTE UE required to improve the communication coverage without any modification of the above description. Further, although the terms "PDCCH", "PDSCH", "PUCCH", and "PUSCH", which refer to physical channels of the existing LTE system, are used to describe the operation of the low-cost UE required to improve the communication coverage, the embodiment of the present disclosure may be used for a case having the same purpose without any modification even when a physical channel for the low-cost UE is newly defined.

Although the embodiment has been described in the detailed description of the present disclosure, the present disclosure may be modified in various forms without departing from the scope of the present disclosure. Thus, the scope of the present disclosure shall not be determined merely based on the described exemplary embodiments and rather determined based on the accompanying claims and the equivalents thereto.

The invention claimed is:

1. A method of receiving broadcast information by a user equipment (UE) in a communication system, the method comprising:
    setting a subframe among a radio frame as a combining window for extracting a broadcasting channel signal;
    receiving a plurality of radio frames including the radio frame from a base station (BS);
    extracting the broadcasting channel signal from the subframe corresponding to the combining window in every predetermined period in the plurality of radio frames;
    accumulating one or more broadcasting channel signals extracted from the plurality of radio frames in the every predetermined period;
    combining the one or more broadcasting channel signals accumulated for a preset time interval; and
    acquiring broadcast information by decoding the combined broadcasting channel signal.

2. The method of claim 1, wherein the UE is a UE for which an improvement in a communication coverage is required.

3. The method of claim 2, further comprising:
    when a time used for synchronization and a cell search is longer than a preset time based on a primary synchronization signal and a secondary synchronization signal included in the plurality of radio frames, identifying that the UE is the UE for which the improvement in the communication coverage is required.

4. The method of claim 2, further comprising:
    when reception power of a signal calculated based on a primary synchronization signal and a secondary synchronization signal included in the plurality of radio frames is smaller than a preset threshold value, identifying that the UE is the UE for which the improvement in the communication coverage is required.

5. The method of claim 1, wherein the predetermined period corresponds to 1024 radio frames.

6. The method of claim 5, wherein a number of one or more broadcasting channel signals accumulated is determined based on a number of subframes to which broadcasting channel signals including the broadcast information are mapped in the 1024 radio frames and on a number of preset subframes for extracting the broadcasting channel signal in the corresponding communication system.

7. The method of claim 5, wherein a number of one or more broadcasting channel signals accumulated is one of 1, 4, and 8.

8. The method of claim 1, wherein the broadcast information is included in a master information block (MIB).

9. The method of claim 8, wherein the MIB includes downlink system frequency information, physical hybrid automatic retransmit request indicator channel setting information, and system frame number information.

10. The method of claim 1, wherein the acquiring of the broadcast information further comprises:
   outputting a master information block (MIB) bit sequence by decoding the combined broadcasting channel signal;
   calculating cyclic redundancy check (CRC) bits using MIBs included in the output MIB bit sequence;
   when CRC bits included in the output MIB bit sequence are identical to the calculated CRC bits based on a comparison therebetween, determining that the MIBs included in the output MIB bit sequence do not contain an error; and
   acquiring the broadcast information from the MIBs included in the output MIB bit sequence.

11. An apparatus for receiving broadcast information by a user equipment (UE) in a communication system, the apparatus comprising:
   a receiver configured to receive a plurality of radio frames from a base station (BS); and
   at least one processor configured to:
      set a subframe among a radio frame included in the plurality of radio frames, as a combining window for extracting a broadcasting channel signal,
      extract the broadcasting channel signal from the subframe corresponding to the combining window in every predetermined period in the plurality of radio frames,
      accumulate one or more broadcasting channel signals extracted from the plurality of radio frames in the every predetermined period,
      combine the one or more broadcasting channel signals accumulated for a preset time interval, and
      acquire broadcast information by decoding the combined broadcasting channel signal.

12. The apparatus of claim 11, wherein the UE is required to improve a communication coverage.

13. The apparatus of claim 12, wherein the at least one processor is further configured to identify that the UE is required to improve the communication coverage when a time used for synchronization and a cell search is longer than a preset time based on a primary synchronization signal and a secondary synchronization signal included in the plurality of radio frames.

14. The apparatus of claim 12, wherein the at least one processor is further configured to identify that the UE is required to improve the communication coverage when reception power of a signal calculated based on a primary synchronization signal and a secondary synchronization signal included in the plurality of radio frames is smaller than a preset threshold value.

15. The apparatus of claim 11, wherein the predetermined period corresponds to 1024 radio frames.

16. The apparatus of claim 15, wherein a number of the one or more broadcasting channel signals accumulated is determined based on at least one of a number of subframes to which a broadcasting channel signal including the broadcast information is mapped in the 1024 radio frames, or a number of preset subframes for extracting the broadcasting channel signal in the corresponding communication system.

17. The apparatus of claim 15, wherein a number of the one or more broadcasting channel signals accumulated is one of 1, 4, and 8.

18. The apparatus of claim 11, wherein the broadcast information is included in a master information block (MIB).

19. The apparatus of claim 18, wherein the MIB includes downlink system frequency information, physical hybrid automatic retransmit request indicator channel setting information, and system frame number information.

20. The apparatus of claim 11, wherein the at least one processor is further configured to:
   output a master information block (MIB) bit sequence by decoding the combined broadcasting channel signal,
   calculate cyclic redundancy check (CRC) bits using MIB included in the output MIB bit sequence,
   if CRC bits included in the output MIB bit sequence are identical to the calculated CRC bits based on a comparison therebetween, identify that the MIB included in the output MIB bit sequence do not contain an error, and
   acquire the broadcast information from the MIB included in the output MIB bit sequence.

* * * * *